(12) United States Patent
Kagiya et al.

(10) Patent No.: US 10,421,153 B2
(45) Date of Patent: Sep. 24, 2019

(54) LASER WELDING METHOD AND LASER WELDING DEVICE

(71) Applicant: Nissan Motor Co., Ltd., Yokohama-shi, Kanagawa (JP)

(72) Inventors: Kazuhiko Kagiya, Kanagawa (JP); Shintaro Nonaka, Kanagawa (JP); Tsuyoshi Higashinakagawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/768,618

(22) PCT Filed: Sep. 14, 2016

(86) PCT No.: PCT/JP2016/077195
§ 371 (c)(1),
(2) Date: Apr. 16, 2018

(87) PCT Pub. No.: WO2017/086008
PCT Pub. Date: May 26, 2017

(65) Prior Publication Data
US 2018/0304404 A1 Oct. 25, 2018

(30) Foreign Application Priority Data
Nov. 17, 2015 (JP) .................................. 2015-225136

(51) Int. Cl.
*B23K 26/20* (2014.01)
*B23K 26/244* (2014.01)
(Continued)

(52) U.S. Cl.
CPC .......... *B23K 26/21* (2015.10); *B23K 26/0006* (2013.01); *B23K 26/0093* (2013.01);
(Continued)

(58) Field of Classification Search
CPC .............. B23K 26/0619; B23K 26/354; B23K 26/356; B23K 26/3568; B23K 26/21;
(Continued)

(56) References Cited

U.S. PATENT DOCUMENTS

2013/0087540 A1* 4/2013 Gu .................... B23K 26/32
219/121.64
2015/0352672 A1* 12/2015 Kinoshita ............ B23K 26/244
219/121.63

FOREIGN PATENT DOCUMENTS

CN 101695790 A 4/2010
CN 102958641 A 3/2013
(Continued)

OTHER PUBLICATIONS

Machine translation of WO-2014-126,712-A1, Nov. 2018.*

*Primary Examiner* — Geoffrey S Evans
(74) *Attorney, Agent, or Firm* — Global IP Counselors, LLP (57) ABSTRACT

In a laser welding method, first, laser light is irradiated on one side surface of one of the metal members to form a protruding portion projecting from the other side surface on the opposite side. Next, a part of the protruding portion that was formed is melted by scanning the laser light to generate a metal melt flow toward a top of the protruding portion so as to form a protrusion. The protrusion projects farther from the other side surface than a height of the protruding portion that was initially formed. Then, the one of the metal member having the protrusion is superposed on another of the metal members so that the protrusion is interposed therebetween. Next, the laser light is irradiated onto a portion where the metal members are superposed to weld the metal members to each other.

16 Claims, 5 Drawing Sheets

(51) Int. Cl.
    *B23K 26/322*     (2014.01)
    *B23K 26/21*     (2014.01)
    *B23K 26/00*     (2014.01)
    *B23K 26/02*     (2014.01)
    *B23K 26/34*     (2014.01)
    *B23K 26/60*     (2014.01)
    *B23K 103/04*     (2006.01)
    *B23K 101/34*     (2006.01)
    *B23K 103/08*     (2006.01)

(52) U.S. Cl.
    CPC ............ *B23K 26/02* (2013.01); *B23K 26/244* (2015.10); *B23K 26/322* (2013.01); *B23K 26/34* (2013.01); *B23K 26/60* (2015.10); *B23K 2101/34* (2018.08); *B23K 2103/04* (2018.08); *B23K 2103/08* (2018.08)

(58) Field of Classification Search
    CPC ...... B23K 26/24; B23K 26/244; B23K 26/26; B23K 26/28; B23K 26/322
    See application file for complete search history.

(56) References Cited

FOREIGN PATENT DOCUMENTS

| | | | |
|---|---|---|---|
| CN | 104994988 | A | 10/2015 |
| JP | 2008-49392 | A | 3/2008 |
| WO | 99/08829 | A1 | 2/1999 |
| WO | 2014/126172 | A1 | 8/2014 |
| WO | WO-2014-126172 | A1 * | 8/2014 |

* cited by examiner

LASER WELDING METHOD AND LASER WELDING DEVICE

CROSS-REFERENCE TO RELATED APPLICATIONS

This application is a U.S. National stage application of International Application No. PCT/JP2016/077195, filed on Sep. 14, 2016. The present application claims priority to Japanese Patent Application No. 2015-225136, filed on Nov. 17, 2015, and the entire disclosure therein is hereby incorporated herein by reference.

BACKGROUND

Field of the Invention

The present invention relates to a laser welding method and a laser welding device.

Background Information

When a vehicle body or a structure of an automobile is assembled, typically, a metal member obtained by press molding a steel plate into a desired shape is formed; laser light is then irradiated onto a portion where parts of a plurality of metal members are superposed to achieve a welding connection (refer to Patent Document 1). A metal member formed from a metal-plated steel plate in which the base metal has been covered with a coating material that has a melting point below that of the base metal is used as a metal member for automobiles. An example of a metal-plated steel plate is, for example, a galvanized steel sheet in which a base metal is covered with a coating material with zinc, which has excellent corrosion resistance, as the main component.

If, when metal members formed from metal-plated steel plates such as galvanized steel sheets are welded, there is a slight gap between the metal members, it becomes difficult to release coating material vapors, such as zinc gas, that are generated by irradiated laser light. Consequently, blow holes are formed and good welds become difficult to realize.

Therefore, in the technique disclosed in Japanese Laid-Open Patent Application No. 2008-49392 (Patent Document 1), first, laser light is irradiated on the surface of a metal member to form a protrusion projecting from the back surface. A plurality of metal members are then superposed with the protrusion interposed therebetween, and laser light is irradiated to weld the metal members to each other. It is possible to reliably form a gap by sandwiching the protrusion between the metal members. As a result, the fumes of the coating material that are generated at the time of welding are made to escape through the gap, thereby suppressing the occurrence of welding defects.

SUMMARY

In the conventional method of forming a protrusion, the protrusion height of the protrusion is primarily determined by the plate thickness of the metal member. Consequently, there are cases in which a protrusion having the necessary protrusion height cannot be formed due the plate thickness, the processing conditions, variations at the time of processing, and the like. An insufficient protrusion height causes welding defects.

An object of the present invention is to provide a laser welding method and a laser welding device that improve welding quality by making it possible to form protrusions having suitable protrusion heights without being limited by the plate thickness of metal members.

The laser welding method of the present invention which realizes the object described above is a laser welding method in which laser light is irradiated on a portion where a plurality of metal members have been superposed to weld the plurality of the metal members to each other. At least one of the metal members of the plurality of metal members is formed from a metal-plated steel plate in which a base metal has been covered with a coating material that has a melting point below that of the base metal. First, laser light is irradiated on one side surface of one of the metal members to form a protruding portion on the other side surface on the opposite side so as to project from the other side surface. Next, melting a part of the protruding portion that was formed by scanning laser light to generate a metal melt flow toward the top of the protruding portion, and to form a protrusion projecting higher than the height of the protruding portion from the other side surface. Then, the one metal member in which the protrusion has been formed is superposed on another of the metal members with the protrusion interposed therebetween and laser light is irradiated onto a portion where the plurality of metal members are superposed, thereby welding the plurality of metal members to each other.

The laser welding device of the present invention which realizes the object described above is a laser welding device in which laser light is irradiated onto a portion where a plurality of metal members have been superposed to weld the plurality of the metal members to each other. At least one of the metal members of the plurality of metal members is formed from a metal-plated steel plate in which a base metal has been covered with a coating material that has a melting point below that of the base metal. The laser welding device comprises a processing head that irradiates laser light toward one side surface of one of the metal members and that is capable of scanning laser light, and a control unit that controls the operation of the processing head. The control unit causes the processing head to irradiate laser light onto one side surface of one of the metal members to form a protruding portion on the other side surface on the opposite side so as to project from the other side surface. Next, melting a part of the protruding portion that was formed by scanning the laser light with the processing head to generate a metal melt flow toward a top of the protruding portion so as to form a protrusion projecting farther from the other side surface than a height of the protruding portion. Furthermore, the control unit causes the processing head to irradiate laser light on a plurality of metal members, which are superposed with the protrusion interposed therebetween in order to weld the metal members.

DETAILED DESCRIPTION OF EMBODIMENTS

Embodiments of the present invention will be explained below with reference to the appended drawings. In the explanations of the drawings, identical elements are given the same reference symbols and redundant explanations are omitted. The dimensional ratios used in the drawings may be exaggerated for the sake of convenience of the explanation and may differ from the actual ratios.

Figure 1A:
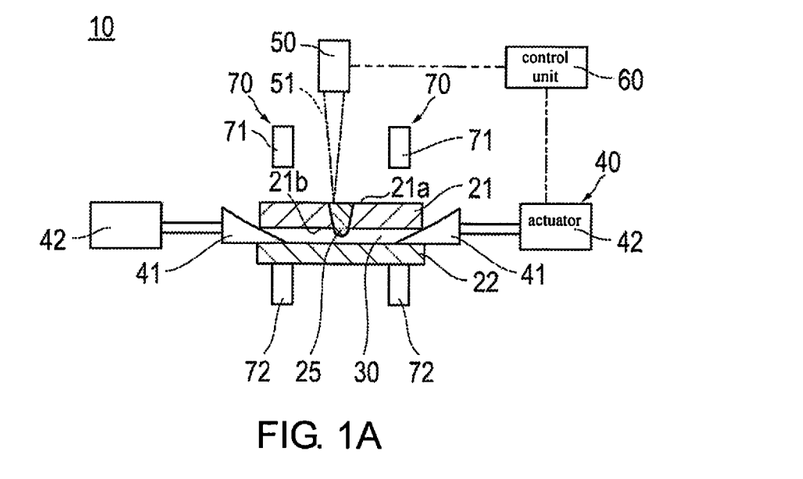
FIG. 1A is a schematic overview of a laser welding device according to one embodiment illustrating a pretreatment step for forming a protrusion.
Figure 1B:
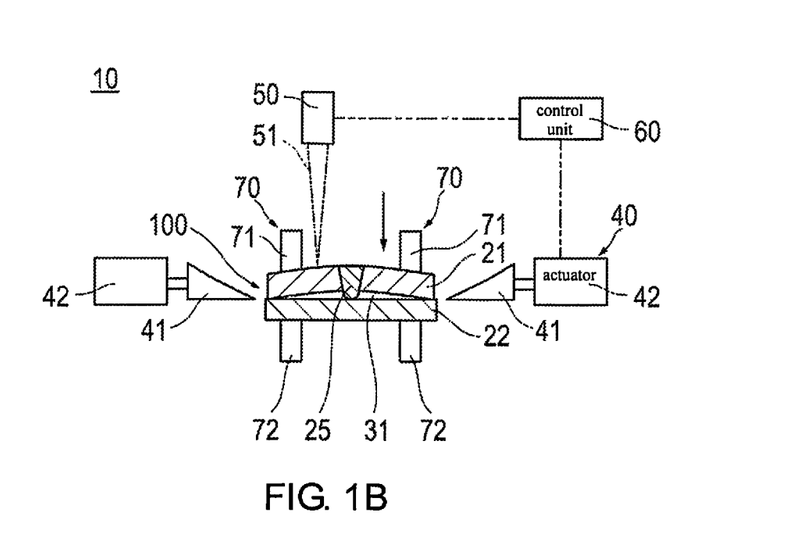
FIG. 1B is a schematic overview of the laser welding device of FIG. 1A illustrating a welding step for welding metal members to each other.

FIGS. 1A and 1B are schematic overviews illustrating the laser welding device according to an embodiment of the present invention. FIG. 1A illustrates a state of the pretreatment step for forming a protrusion. FIG. 1B illustrates a state of the welding step for welding metal members 21, 22 to each other.

With reference to FIG. 1, the laser welding device 10 produces a welded member 100 by welding a plurality of metal members 21, 22 to each other by irradiating laser light 51 onto a portion where the plurality of metal members 21, 22 have been superposed. At least one metal member of the plurality of metal members 21, 22 is made from a metal-plated steel plate in which a base metal has been covered with a coating material that has a melting point below that of the base metal. An example of a metal-plated steel plate is, for example, galvanized steel sheets, widely used as metal members for automobiles, in which a base metal is covered with a coating material that contains zinc, which has excellent corrosion resistance, as the main component.

In general, the laser welding device 10 comprises a processing head that irradiates laser light 51 toward a front surface 21a (corresponding to one side surface) of a first metal member 21 (corresponding to one metal member), and that is capable of scanning laser light 51, and a control unit 60 that controls the operation of the processing head 50. The control unit 60 causes the processing head 50 to irradiate laser light 51 onto the front surface 21a of the first metal member 21 to form a protruding portion 24 projecting from the back surface 21b on the he back surface 21b (corresponding to the other side surface on the opposite side). Next, melting a part of the formed protruding portion 24 by scanning the laser light 51, the control unit 60 causes a metal melt flow to be formed toward a top of the protruding portion 24 and causes a protrusion 25 to be formed that projects higher than a height of the protruding portion 24 from the back surface 21b (FIG. 1A). Furthermore, the control 60 unit causes the processing head 50 to irradiate laser light 51 on a plurality of the metal members 21, 22, which are superposed with the protrusion 25 interposed therebetween in order to weld the metal members together (FIG. 1B). The laser welding device 10 comprises a jig unit 40. The jig unit 40 can freely hold the first and second metal members 21, 22 in a state of being combined with a space 30 formed therebetween and can freely hold the first metal member 21 in a state of being superposed on the second metal member 22. The control unit 60 also controls the operation of the jig unit 40. The laser welding device 10 will be described in detail below.

The jig unit 40 is freely movable between a first position (FIG. 1A), in which a plurality (two in the illustrated example) of the first and second metal members 21, 22 are combined with each other with a space 30 therebetween, and a second position (FIG. 1B), in which the first and second metal members 21, 22 are superposed. The control unit 60 moves the jig unit 40 to the first position and holds the first and second metal members 21, 22 in a combined state with a space 30 opened therebetween. Next, the control unit 60 causes laser light 51 to be irradiated from the processing head 50 to form a protrusion 25 (FIG. 1A). Then, the control unit 60 moves the jig unit 40 from the first position to the second position and welds the first and second metal members 21, 22 in a superposed state with the protrusion 25 interposed therebetween (FIG. 1B). The second metal member 22 on the lower side is placed on a welding die, not shown.

The jig unit 40 comprises a pawl member 41 that can be freely inserted between the first and second metal members 21, 22, and an actuator 42 that moves the pawl member 41 forth and back with respect to the space between the first and second metal members 21, 22. The end surface on the insertion side of the pawl member 41 is formed with a tapered shape. The actuator 42 is configured from an air cylinder, etc. As illustrated in FIG. 1A, the pawl member 41 is moved forward with the actuator 42 and is inserted between the first and second metal members 21, 22. The jig unit 40 moves to the first position to hold the first and second metal members 21, 22 in a combined state with a space 30 opened therebetween. The pawl member 41 is moved backwards by the actuator 42 and pulled out from between the first and second metal members 21, 22, as illustrated in FIG. 1B. The jig unit 40 moves to the second position to superpose the first and second metal members 21, 22.

The processing head 50 is disposed above the first metal member 21. The processing head 50 is configured from a well-known laser irradiation device. The processing head 50 irradiates laser light 51 on the front surface 21a of the first metal member 21. The processing head 50 comprises a pivotable mirror and is capable of scanning the laser light 51 along any trajectory, such as a linear shape, a curved shape, a circular shape, or an arc shape. The laser light 51 may be irradiated spotwise without scanning. The processing head 50 can also freely adjust the amount of heat that is input to the object to be welded by adjusting, for example, the laser output, the scanning speed, and the expansion/contraction of the spot diameter.

The processing head 50 is attached to a robot hand of a welding robot, which is not shown. The welding robot is taught according to a teaching program and moves the robot hand with a predetermined movement.

The laser welding device 10 comprises a plurality of clamp members 70 that clamp the first and second metal members 21, 22 at the time of welding. The clamp member 70 may employ any appropriate configuration. The clamp member 70 of the illustrated example comprises an upper pressing portion 71 that is disposed above the first metal member 21 and a lower pressing portion 72 that is disposed below the second metal member 22. The upper pressing portion 71 and the lower pressing portion 72 are driven by a fluid pressure cylinder, such as a hydraulic cylinder, which is not shown, and sandwich and clamp the first and second metal members 21, 22.

The laser welding method using the laser welding device 10 will now be described. The first and second metal members 21, 22 are bonded by means of a pretreatment step (FIG. 1A) for forming the protrusion 25 on the back surface 21b of the first metal member 21 from the upper side, and a welding step (FIG. 1B) for laser welding the first and second metal members 21, 22 in a state of being superposed one on the other with the protrusion 25 interposed therebetween.

Pretreatment Step

First, the pretreatment step will be described with reference to FIGS. 1-3.

Figure 2A:
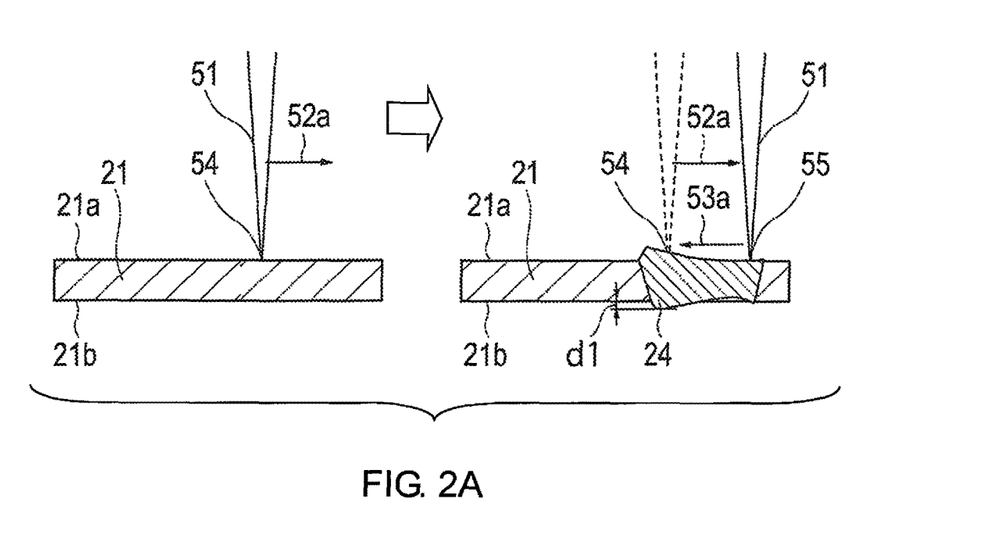
FIG. 2A is a schematic cross-sectional view illustrating the manner in which a protruding portion is formed by scanning laser light.
Figure 2B:
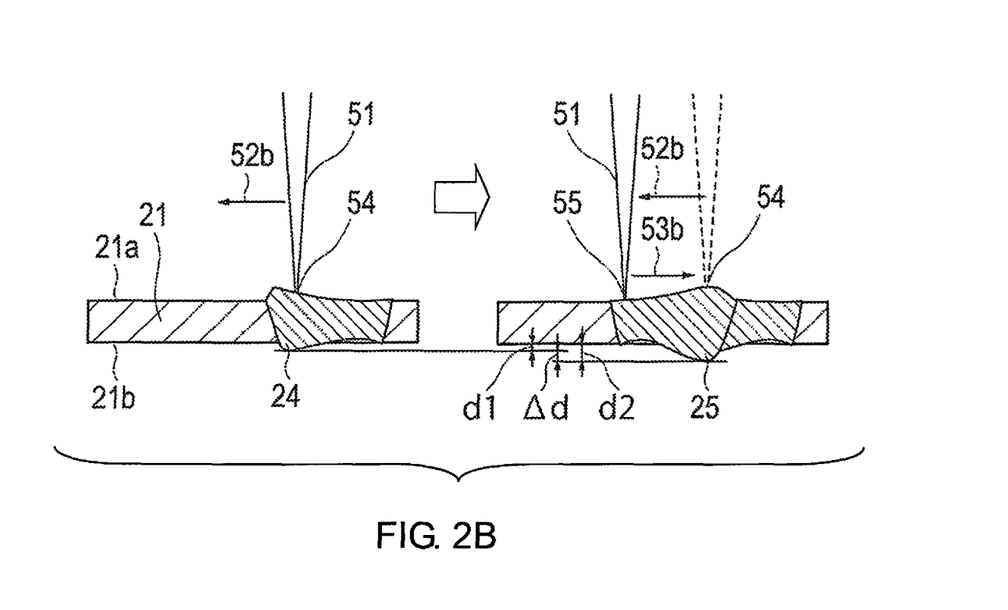
FIG. 2B is a schematic cross-sectional view illustrating the manner in which a protrusion is formed that projects higher than the height of the protruding portion by scanning laser light.
Figure 3A:
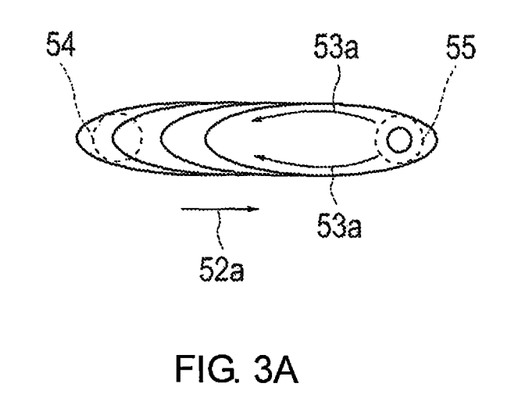
FIG. 3A is a schematic plan view illustrating the manner in which a protruding portion is formed.
Figure 3B:
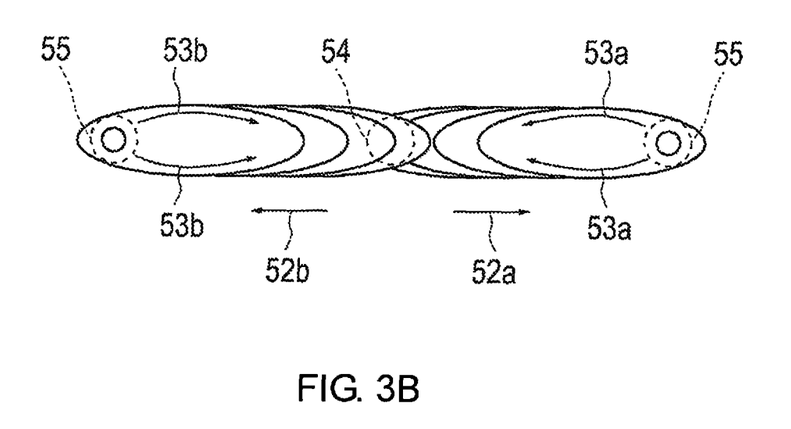
FIG. 3B is a schematic plan view illustrating the manner in which a protrusion is formed.

FIGS. 2A, 2B and FIGS. 3A, 3B are schematic views describing the procedure for forming the protrusion 25. FIG. 2A is a pair of cross-sectional views illustrating the manner in which the protruding portion 24 is formed by scanning the laser light 51. FIG. 2B is a pair of cross-sectional views illustrating the manner in which the protrusion 25 projecting higher than the height from the protruding portion 24 is formed by scanning laser light 51. FIG. 3A is a plan view illustrating the manner in which the protruding portion 24 is formed, and FIG. 3B is a plan view illustrating the manner in which a protrusion 25 is formed. The arrows 52a, 52b in the drawing indicate the scanning direction of the laser light 51, and the arrows 53a, 53b indicate the direction in which the metal melt flows in the direction opposite to the scanning direction. The area surrounded by the broken lines indicates the starting end portion of scanning 54 and the terminal end portion of scanning 55.

The second metal member 22 on the lower side is placed on a welding die, which is not shown, as illustrated in FIG. 1A. The pawl member 41 is moved forward to a position beyond the edge of the second metal member 22. The first metal member 21 on the upper side is placed on the pawl member 41. The space 30 may be appropriately determined by giving consideration to a dimension with which the protrusion 25 formed in the first metal member 21 will not be joined to the second metal member 22, and a dimension that is moved during welding. An example of dimensions for the space 30 is 0.5 mm-5 mm.

The protrusion 25 is formed by irradiating the laser light 51 twice. First, the control unit 60 controls the operation of the processing head 50 and causes the laser light 51 to be irradiated on the front surface 21a of the first metal member 21 to form the protruding portion 24 projecting from the back surface 21b on the back surface 21b, (FIG. 2A and FIG. 3A). In this case, it is preferable to scan the laser light 51 to form the protruding portion 24 at the starting end portion of the scanning 54. This is due to the fact that, by generating a metal melt flow toward the starting end portion of the scanning 54, it is possible to form the protruding portion 24 having a relatively long protrusion height from the back surface 21b. Next, by controlling the operation of the processing head 50 and causing the laser light 51 to be scanned while melting a part of the protruding portion 24 that was formed, the control unit 60 causes a metal melt flow to be generated toward a top of the protruding portion 24. As a result, a protrusion 25 is formed projecting higher than the protrusion height from the back surface 21b of the protruding portion 24 (FIG. 2B and FIG. 3B).

More specifically, with respect to the first pass of the irradiated laser light 51, the laser light 51 is scanned on the front surface 21a of the first metal member 21 in a left-to-right direction (arrow 52a) in the drawing (FIG. 2A and FIG. 3A). The protruding portion 24 is formed on the back surface 21b of the first metal member 21 so as to project from the back surface 21b. By scanning the laser light 51, a protruding portion 24 is formed at the starting end portion of scanning 54, and a recess is formed at the terminal end portion of scanning 55. When the scanning of the laser light 51 reaches a predetermined length, the irradiation of the laser light 51 is stopped. The protrusion height of the protruding portion 24 from the back surface 21b is indicated by the reference symbol d1, as illustrated in FIG. 2A.

During scanning of laser light 51, the temperature of the metal melt is higher at the terminal end portion of scanning 55 side and lower at the starting end portion of scanning 54 side. The surface tension of the metal melt is smaller in portions with a high temperature, and surface tension is higher in portions with a low temperature. The metal melt is pulled from the high temperature side to the low temperature side due to the difference in surface tension caused by the temperature difference, which generates Marangoni convection. In this manner, due to the temperature distribution of the metal melt, the metal melt flows in a direction (arrow 53a) opposite to the scanning direction (arrow 52a), and the starting end portion of scanning 54 rises stably. As a result, it is possible to form a stable protruding portion 24 at the starting end portion of scanning 54.

When forming the protruding portion 24, the time for scanning the laser light 51 is preferably at least as long as the time required for the starting end portion 54 to solidify to form the protruding portion 24.

When the irradiation of the laser light 51 is stopped, the flow direction of the metal melt, toward the starting end portion of scanning 54 (arrow 53a), is reversed and the metal melt starts to flow toward the terminal end portion of scanning 55. Accordingly, by not stopping the scanning of the laser light 51 until the starting end portion 54 has solidified, it is possible to form a stable protruding portion 24 at the starting end portion of scanning 54.

The first pass of the irradiated laser light 51 cannot be interrupted until the protruding portion 24 is formed. Accordingly, the second pass of the irradiated laser light 51 can be started at any timing from immediately after the first pass of the irradiated laser light 51 has been completed.

With respect to the second pass of the irradiated laser light 51, the portion where the protruding portion 24 was formed in the starting end portion 54 of the first pass is set as the starting end portion 54 of the second pass. The laser light 51 is scanned on the front surface 21a of the first metal member 21 in the right-to-left direction (arrow 52b) in the drawing, which is opposite to the first pass (FIG. 2B and FIG. 3B). A metal melt flow toward the top of the protruding portion 24 is formed (arrow 53b) and the height of the protruding portion 24 is increased. As a result, a protrusion 25 is formed at the starting end portion of scanning 54, and a recess is formed at the terminal end portion of scanning 55. When the scanning of the laser light 51 reaches a predetermined length, the irradiation of the laser light 51 is stopped. The protrusion height from the back surface 21b of the protrusion 25 is indicated by the reference symbol d2, as illustrated in FIG. 2B. The protrusion height of the protrusion 25 is increased by $\Delta d$ (d2−d1) with respect to the protrusion height of the protruding portion 24. The protrusion height d2 of the protrusion 25 can be appropriately selected from within a range that meets the object of suppressing the generation of blow holes. An example of dimensions for the protrusion height of the protrusion 25 is 0.05 mm-0.3 mm.

At the time of the second scanning pass of the laser light 51 as well, due to the temperature distribution of the metal melt, the metal melt flows in the direction (arrow 53b) opposite to the scanning direction (arrow 52b), and the protruding portion 24 present at the starting end portion of scanning 54 rises stably. As a result, it is possible to form a stable protrusion 25 at the starting end portion of scanning 54.

When forming a protrusion 25, it is preferable to scan the laser light 51 so as to leave the apex of the protruding portion 24 that rises on the back surface 21b side.

This is due to the fact that, as a result of more molten metal flowing to the apex of the protruding portion 24, which is already raised, by scanning the laser light 51 so as to leave the apex of the protruding portion 24, it is possible to form a protrusion 25 that projects farther than the protrusion height of the protruding portion 24.

When forming the protrusion 25, the time for scanning the laser light 51 is preferably at least as long as the time required for the starting end portion 54 to solidify to form the protrusion 25.

When the irradiation of the laser light 51 is stopped, the flow direction of the metal melt, toward the starting end portion of scanning 54 (arrow 53b), is reversed and the metal melt starts to flow toward the terminal end portion of scanning 55. Accordingly, by not stopping the scanning of the laser light 51 until the starting end portion 54 is solidified, it is possible to form a stable protrusion 25 at the starting end portion of scanning 54.

When forming the protrusion 25, with the protruding portion 24 as the center, it is preferable to scan the laser light 51 in the direction opposite (from right to left in FIG. 2) to the direction in which the laser light 51 is scanned when forming the protruding portion 24 (from left to right in FIG. 2).

By scanning the laser light 51 in the opposite direction with the protruding portion 24 as the center, it becomes easy to create a teaching program for teaching the welding robot how to scan the laser light 51 the second time. Furthermore, it is possible to shorten the travel time of the robot hand (irradiation time), to reduce the time required for laser welding.

When scanning the laser light 51 in the opposite direction with the protruding portion 24 as the center to form the protrusion 25, a protrusion 25 is formed in the central portion of the weld bead on the first metal member 21 and heat sinks are generated at both ends of the weld bead (refer to FIG. 2B).

Welding Step

Next, the welding step will be described with reference to FIG. 1.

The pawl member 41 is moved backward to a position away from the edge of the second metal member 22, as illustrated in FIG. 1B. The first metal member 21 on the upper side is superposed on the second metal member 22 on the lower side, with the protrusion 25 interposed therebetween. The upper pressing portion 71 and the lower pressing portion 72 of the clamp member 70 are driven to clamp the first and second metal members 21, 22. Then, laser light 51 is irradiated from the processing head 50 onto a portion where the first and second metal members 21, 22 have been superposed to weld the first and second metal members to each other. The laser light 51 in the welding step may follow a linear or curved trajectory or be point-like.

In the welding step, a gap 31 larger than when the protruding portion 24 is sandwiched can be reliably formed with the protrusion 25 sandwiched between the superposed first and second metal members 21, 22. Zinc gas, which is a coating material vapor that is generated by the irradiation of laser light 51 during welding, is released through this enlarged gap 31. As a result of enhancing the permeability of zinc gas, the generation of blow holes is suppressed and the welding quality is improved.

This type of laser welding technique is suitable for a case in which metal members for automobiles, in which galvanized steel sheets are frequently used, are welded and joined.

Figure 4A:
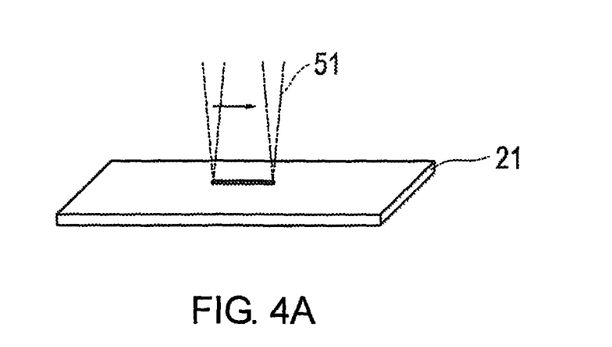
FIG. 4A is a perspective view illustrating the manner in which a protruding portion or a protrusion is formed by scanning laser light along a linear trajectory.
Figure 4B:
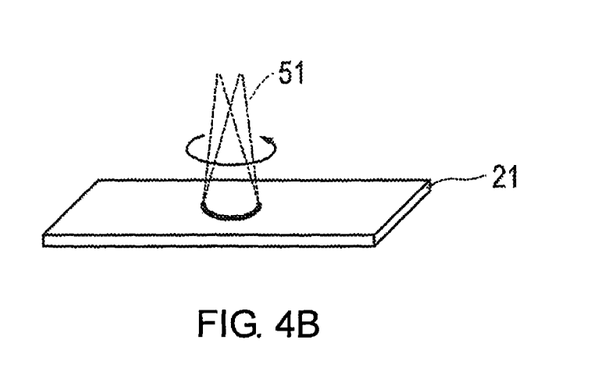
FIG. 4B is a perspective view illustrating the manner in which a protruding portion or a protrusion is formed by scanning laser light along the curve of an arc.
Figure 4C:
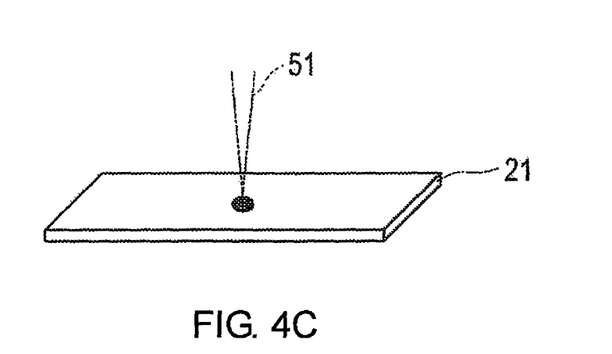
FIG. 4C is a perspective view illustrating the manner in which a protruding portion is formed by the spotwise irradiation of laser light.

FIG. 4A is a perspective view illustrating the manner in which a protruding portion 24 or a protrusion 25 is formed by scanning laser light 51 along a linear trajectory; FIG. 4B is a perspective view illustrating the manner in which a protruding portion 24 or a protrusion 25 is formed by scanning laser 51 light along the curve of an arc; and FIG. 4C is a perspective view illustrating the manner in which a protruding portion 24 is generated by irradiating laser light 51 in the form of a spot.

When forming the protruding portion 24, the scanning of the laser light 51 is preferably carried out along a trajectory that the starting end portion 54.

Similarly, when forming the protrusion 25, the scanning of the laser light 51 is preferably carried out along a trajectory that maintains the starting end portion 54.

This is due to the fact that the laser light 51 will not be irradiated again onto the starting end portion 54 during a single pass. Therefore, since a protruding portion 24 or a protrusion 25 will not be re-melted once formed, it is possible to form a stable protruding portion 24 or protrusion 25.

The scanning of the laser light 51 is preferably carried out along the linear trajectory illustrated in FIG. 4A, or along the arc-shaped trajectory illustrated in FIG. 4B.

This is due to the fact that the scanning trajectory of the laser light 51 maintains the starting end portion 54, and it is possible to form a stable protruding portion 24 or protrusion 25.

In terms of the second pass of the irradiated laser light 51, it is necessary to scan the laser light 51. However, it is not always necessary to scan the laser light 51 with respect to the first pass irradiation of laser light 51.

A punctiform protruding portion 24 may be formed by carrying out the irradiation of laser light 51 in the form of a spot without scanning the laser light 51, as illustrated in FIG. 4C. The punctiform protruding portion 24 is formed by the central portion being raised by the action of the surface tension of the metal melt.

FIGS. 5A to 5E are plan views schematically illustrating examples of arrangements of protrusions 25 with respect to beads 56 at the time of main welding.

Figure 5A:
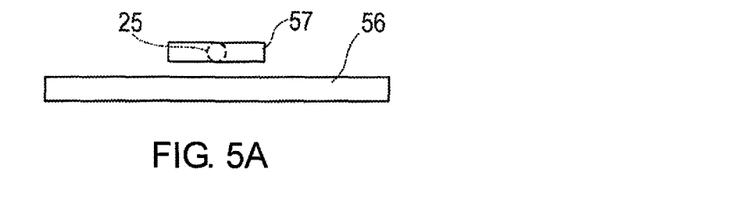
FIGS. 5A to 5E are a series of plan views schematically illustrating examples of arrangements of protrusions with respect to beads at the time of main welding.
Figure 5B:
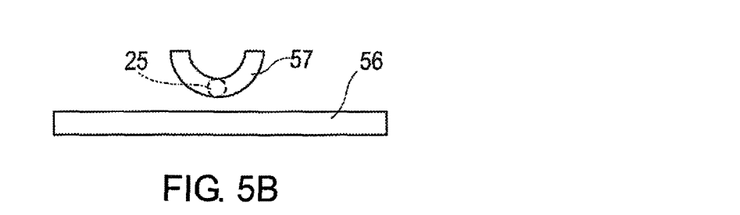

In the drawing, the portion surrounded by the broken line indicates the protrusion 25. In the illustrated example, when forming the protrusion 25, first, the laser light 51 is scanned to form a protruding portion 24 at the starting end portion of scanning 54. Next, with the protruding portion 24 as the center, the laser light 51 is scanned in the direction opposite to the scanning direction when forming the protruding portion 24, to form the protrusion 25. The protrusion 25 illustrated in FIG. 5A is formed by scanning the laser light 51 such that the bead 57 after pretreatment has a linear shape. The bead 57 is preferably formed so as to be parallel to the bead 56 formed at the time of the main welding. This is due to the fact that it becomes possible to bring the protrusion 25 closer to the bead 56 formed at the time of main welding. The protrusion 25 illustrated in FIG. 5B is formed by scanning the laser light 51 such that the bead 57 after pretreatment has an arc-like shape. The protrusion 25 illustrated in FIG. 5C is formed by scanning the laser light 51 such that the bead 57 after pretreatment has a shape that combines a straight line and an arc.

Figure 5C:
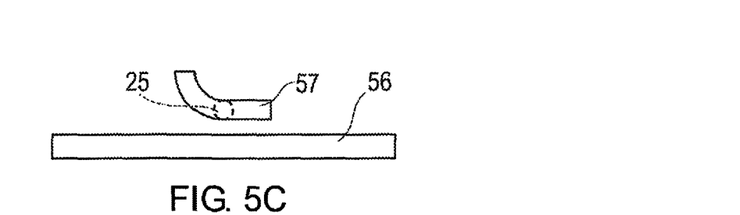

When applying one protrusion 25 with respect to the bead 56 formed at the time of the main welding, it is preferred that the protrusion 25 be formed so as to be positioned substantially in the central portion of the longitudinal direction of the bead 56 formed at the time of the main welding, as illustrated in FIGS. 5A to 5C. This is due to the fact that the gap 31 that is formed by the protrusion 25 will have the same shape in the left and right directions in the drawing with the protrusion 25 as the substantial center, and it becomes a simple matter to uniformly release the zinc gas at the time of welding.

Figure 5D:
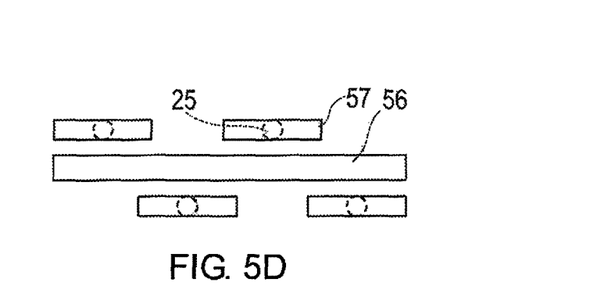
Figure 5E:
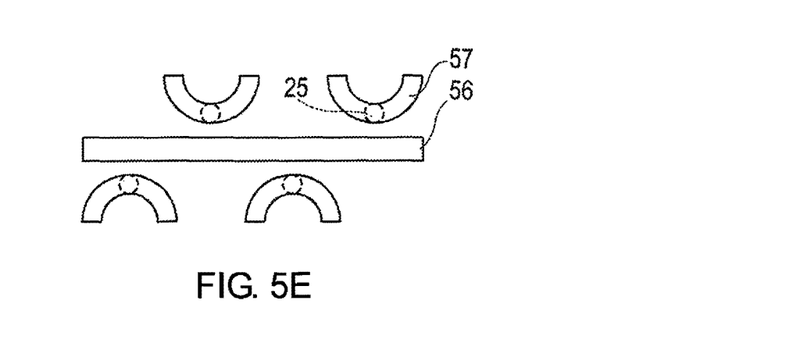

When applying a plurality of protrusions 25 with respect to the bead 56 formed at the time of the main welding, it is preferred that the protrusions 25 be formed to have a staggered arrangement, with the bead 56 formed at the time of the main welding interposed therebetween, as illustrated in FIGS. 5D and 5E. This is due to the fact that the gap 31 that is formed by the protrusions 25 will have the same shape in the left and right directions as well as the up and down directions in the drawing of the bead 56, and it becomes a simple matter to uniformly release the zinc gas at the time of welding.

Whether or not to form the protruding portion 24 by scanning the laser light 51 or by irradiating the laser light in the form of a point, whether to form the protruding portion 24 by scanning the laser light 51 in a linear or arc-shaped trajectory, and whether to form the protrusion 25 by scanning the laser light 51 in a linear or arc-shaped trajectory may be freely combined. An appropriate combination can be selected according to the shape and length of the bead 56 formed at the time of the main welding, or depending on how wide or narrow the overlapping area of the first and second metal members 21, 22 is.

As described above, the laser welding method of the present embodiment comprises a pretreatment step and a welding step; in the pretreatment step, laser light 51 is irradiated onto the front surface 21a of the first metal member 21 to form a protruding portion 24 on a back surface 21b projecting from said back surface 21b, and next, a metal melt flow is generated toward the top of the protruding portion 24 by scanning the laser light 51 while melting a part of the formed protruding portion 24, to thereby form a protrusion 25 projecting higher than the height of the protruding portion 24 from the back surface 21b. In the welding process, the first metal member 21 in which the protrusion 25 has been formed is superposed on the second metal member 22 with the protrusion 25 interposed therebetween, and the laser light 51 is irradiated on the portion where the first and second metal members 21, 22 are superposed to weld the first and second metal members 21, 22 to each other.

According to such a method, it is possible to stably form a protrusion 25 projecting higher than the protrusion height of the protruding portion 24 in the pretreatment step. In the welding step, a larger gap 31 than when the protruding portion 24 is sandwiched can be reliably formed with the protrusion 25 being sandwiched between the superposed first and second metal members 21, 22. Zinc gas, which is a coating material vapor that is generated by the irradiation of laser light 51 during welding, is released through this expanded gap 31. As a result of enhancing the permeability of zinc gas, the generation of blow holes is suppressed, and the welding quality is improved. Therefore, according to the laser welding method of the present embodiment, it is possible to improve welding quality by making it possible to form protrusions 25 having suitable protrusion heights without being limited by the plate thickness of the first and second metal members 21, 22.

When a protrusion 25 is formed, it is preferable to scan the laser light 51 so that the apex of the protruding portion 24 that rises on the back surface 21b side remains.

According to such a method, as a result of a greater amount of metal melt flowing to the apex of the protruding portion 24, which is already raised, it is possible to form a protrusion 25 that projects farther than the protrusion height of the protruding portion 24.

When the protrusion 25 is formed, the time for scanning the laser light 51 is preferably at least as long as the time required for the starting end portion 54 to solidify in order to form the protrusion 25.

This is due to the fact that, according to such a method, since the scanning of the laser light 51 is not stopped until the starting end portion 54 solidifies, it is possible to form a stable protrusion 25 at the starting end portion of scanning 54. As a result, the gap 31 between the first and second metal members 21, 22 can be reliably formed.

When the protruding portion 25 is formed, the scanning of the laser light 51 is preferably carried out along a trajectory that maintains the starting end portion 54.

According to such a method, the laser light 51 will not be irradiated again onto the starting end portion 54 during one pass. Since the protrusion 25 will not be re-melted once formed, a stable protrusion 25 can be formed.

It is preferable to carry out the scanning of the laser light 51 along a linear or an arc-shaped trajectory.

According to such a method, the scanning of the laser light 51 follows a trajectory that maintains the starting end portion 54, and it is possible to form a stable protrusion 25.

When forming the protrusion 25, it is preferred that the laser light 51 be scanned to form a protruding portion 24 at the starting end portion of scanning 54.

According to such a method, by generating a metal melt flow toward the starting end portion of scanning 54, it is possible to form a protruding portion 24 having a relatively large protrusion height from the back surface 21b.

When the protrusion 25 is formed, with the protruding portion 24 as the center, it is preferred that the laser light 51 be scanned in the direction opposite to the direction in which the laser light 51 is scanned when forming the protruding portion 24.

According to such a method, since the laser light 51 is scanned in the opposite direction with the protruding portion 24 as the center, it becomes a simple matter to create a teaching program for teaching the welding robot how to scan the laser light 51 the second time. Furthermore, it is possible to shorten the travel time of the robot hand (irradiation time) in order to reduce the time required for the laser welding.

When the protruding portion 24 is formed, the time for scanning the laser light 51 is preferably at least as long as the time required for the starting end portion 54 to solidify in order to form the protruding portion 24.

According to such a method, since the scanning of the laser light 51 is not stopped until the starting end portion 54 solidifies, it is possible to form a stable protruding portion 24 at the starting end portion of scanning 54, and then to reliably form a protrusion 25 with a high protrusion height.

When the protruding portion 24 is formed, the scanning of the laser light 51 is preferably carried out along a trajectory that maintains the starting end portion 54.

According to such a method, the laser light 51 will not again be irradiated onto the starting end portion 54 during one pass. Since the protruding portion 24 will not be re-melted once formed, a stable protruding portion 24 can be formed.

It is preferred that the scanning of the laser light 51 be carried out along a linear or an arc-shaped trajectory.

According to such a method, the scanning of the laser light 51 follows a trajectory that maintains the starting end portion 54, and it is possible to form a stable protruding portion 24.

The metal-plated steel plate is a galvanized steel sheet. By applying a galvanized steel sheet, good welds suppressing the generation of blow holes can be obtained.

The laser welding device 10 of the present embodiment comprises a processing head 50 that irradiates laser light 51 onto a front surface 21a of a first metal member 21, and that is capable of scanning the laser light 51, and a control unit 60 that controls the operation of the processing head 50. The control unit 60 causes the processing head 50 to irradiate laser light 51 onto the front surface 21a of the first metal member 21 in order to form a protruding portion 24 on a back surface 21b, projecting from said back surface 21b. Next, by causing laser light 51 to be scanned while melting a part of the formed protruding portion 24 by the processing head 50, the control unit 60 causes a metal melt flow to be generated toward the top of the protruding portion 24, and causes a protrusion 25 to be formed that projects farther than the height of the protruding portion 24 from the back surface 21b. Furthermore, the control 60 unit causes the processing head 50 to irradiate laser light 51 onto a plurality of the metal members, which are superposed with the protrusion 25 interposed therebetween in order to weld the metal members.

According to such a configuration, it is possible to stably form a protrusion 25 that projects farther than the protrusion height of the protruding portion 24. A larger gap 31 than when the protruding portion 24 is sandwiched can be reliably formed with the protrusion 25 being sandwiched between the superposed first and second metal members 21, 22. Zinc gas, which is a coating material vapor that is generated by the irradiation of laser light 51 during welding, is released through this expanded gap 31. As a result of enhancing the permeability of zinc gas, the generation of blow holes is suppressed and the welding quality is improved. Therefore, according to the laser welding device 10 of the present embodiment, it is possible to improve the welding quality by making it possible to form protrusions 25 having suitable protrusion heights without being limited by the plate thickness of the first and second metal members 21, 22.

When a protrusion 25 is formed, the control unit 60 preferably causes the laser light 51 to be scanned so that the apex of the protruding portion 24 that projects from the back surface 21b side remains.

According to such a configuration, as a result of a greater amount of metal melt flowing to the apex of the protruding portion 24, which is already raised, it is possible to form a protrusion 25 that projects farther than the protrusion height of the protruding portion 24.

When the protrusion 25 is formed, the control unit 60 preferably sets the time for scanning the laser light 51 to be at least as long as the time required for the starting end portion 54 to solidify in order to form the protrusion 25.

This is due to the fact that, according to such a configuration, since the scanning of the laser light 51 is not stopped until the starting end portion 54 has solidified, it is possible to form a stable protrusion 25 at the starting end portion of scanning 54. As a result, the gap 31 between the first and second metal members 21, 22 can be reliably formed.

When the protrusion 25 is formed, the control unit 60 preferably causes the laser light 51 to be scanned to form a protruding portion 24 at the starting end portion of scanning 54.

According to such a configuration, by generating a metal melt flow toward the starting end portion of scanning 54, it is possible to form a protruding portion 24 having a relatively large protrusion height from the back surface 21b.

A case in which a plurality of metal members are formed from metal-plated steel plates was described, but a coating material vapor could be generated as long as a coating material covers one surface of the steel plates to be welded. Therefore, the present invention can be applied to the welding of metal-plated steel plates, in which one side or both sides of the base metal of at least one metal member of the plurality of metal members is covered.

An embodiment was described in which the second scanning pass of laser light 51 is started from the protruding portion 24, but the present invention is not limited to this case. It is sufficient if the second scanning pass of the laser light 51 is able to generate a metal melt flow toward the top of the protruding portion 24 by scanning the laser light 51 while melting a part of the formed protruding portion 24. Therefore, it is also possible to start the second scanning pass of the laser light 51 from the front side of the protruding portion 24. Even in this case, the protrusion 25 is formed so as to increase the projection of the protruding portion 24.

When welding a plurality of metal members, there are cases in which both locations where the effect of suppressing the generation of blow holes can be realized solely by means of the protrusion height of the protruding portion 24, as well as locations where the above-described suppression effect cannot be sufficiently realized solely by means of the protrusion height of the protruding portion 24, co-exist, due to the influence of the plate thickness, surface shape, welding positions, etc., of the metal members. In such a case, it is not necessary to carry out a second scanning pass of the laser light 51 with respect to all of the protruding portions 24 formed by the first scanning pass of the laser light 51. The required height can be satisfied by forming protrusions 25 with a second scanning pass of the laser light 51 only with respect to locations where the above-described suppression effect cannot be sufficiently obtained solely by means of the protrusion height of the protruding portion 24. It is possible to suppress the generation of blow holes and to improve the welding quality, even if metal members comprising protruding portions 24 and protrusions 25 having different protrusion heights are applied. By reducing the number of locations where the laser light 51 is irradiated twice, it is possible to shorten the time of the pretreatment step, and to reduce the time required for laser welding.

A case in which the first and second metal members 21, 22 are flat plates was shown, but it goes without saying that the present invention can be applied to metal members having a curved surface.

Test Example

As the first pass for forming a protruding portion 24, laser welding was carried out in a range of about +15% of the laser output that is capable of penetrating the upper plate (0.9 mm), with a spot diameter φ of 550-800 μm, speed of 80 mm/s, and in a linear shape. A protruding portion 24 (protrusion height of 0.12 mm) was formed at the starting end portion 54.

Next, as the second pass to increase the protrusion height of the protruding portion 24, laser welding was carried out in a range of about +15% of the laser output that is capable of penetrating the upper plate, with a spot diameter φ of 550-800 μm, and speed of 80 mm/s, in a linear shape in the direction opposite to the first pass, with a portion of the protruding portion 24 formed during the first pass as the starting point. A protrusion 25 (protrusion height 0.19 mm) having a higher protrusion height than the protruding portion 24 was formed at the starting end portion 54.

The upper plate and the lower plate were overlapped and clamped so as to sandwich the protrusion 25. Laser welding was carried out with a heat quantity with which it is possible to penetrate and weld together the upper and lower plates. Defects were not generated in the welded portion, since the generated zinc gas escaped from the gap 31 formed by the protrusion 25.

While the laser output and the scanning distance differ depending the plate thickness and the processing speed of the metal members, it was confirmed that the tendency is the same.

The invention claimed is:

1. A laser welding method for welding a plurality of metal members to each other by irradiating laser light onto a portion where the plurality of metal members have been superposed, in which at least one of the metal members from among the plurality of metal members is formed from a metal-plated steel plate in which a base metal has been covered with a coating material that has a melting point below that of the base metal, the laser welding method comprising:
    irradiating laser light on one side surface of one of the metal members to form a protruding portion on the other side surface on the opposite side so as to project from the other side surface, and next, melting a part of the protruding portion that was formed by scanning the laser light to generate a metal melt flow toward a top of the protruding portion so as to form a protrusion having a height that projects farther from the other side surface than a height of the protruding portion so that the height of the protrusion is greater than the height of the protruding portion; and
    superposing the one of the metal member having the protrusion on another of the metal members so that the protrusion is interposed therebetween, and irradiating the laser light onto a portion where the plurality of metal members are superposed to weld the plurality of metal members to each other.

2. The laser welding method according to claim 1, wherein
    the scanning of the laser light when forming the protrusion is scanned so that an apex of the protruding portion that rises on the other side surface remains.

3. The laser welding method according to claim 1, wherein
    the scanning of the laser light when forming the protrusion is scanned for a time that is at least as long as a time required for a starting end portion to solidify in order to form the protrusion.

4. The laser welding method according to claim 1, wherein
    the scanning of the laser light when forming the protrusion is carried out along a trajectory that maintains a starting end portion.

5. The laser welding method according to claim 4, wherein
    the scanning of the laser light is carried out along a linear trajectory or an arc-shaped trajectory.

6. The laser welding method according to claim 1, wherein
    the scanning of the laser light when forming the protrusion is scanned to form the protruding portion at a starting end portion of scanning.

7. The laser welding method according to claim 6, wherein
    the scanning of the laser light when forming the protrusion with the protruding portion as a center is scanned toward a direction opposite to a direction in which the laser light is scanned when forming the protruding portion.

8. The laser welding method according to claim 6, wherein
    the scanning of the laser light when forming the protruding portion is scanned for a time that is at least as long as a time required for the starting end portion to solidify in order to form the protruding portion.

9. The laser welding method according to claim 6, wherein
    the scanning of the laser light when forming the protruding portion is carried out along a trajectory that maintains the starting end portion.

10. The laser welding method according to claim 9, wherein
    the scanning of the laser light is carried out along a linear trajectory or an arc-shaped trajectory.

11. The laser welding method according to claim 1, wherein
    the metal-plated steel plate is a galvanized steel sheet.

12. The laser welding method according to claim 1, wherein
    the protruding portion is formed at a start of laser scanning, and the protrusion is formed at the end of laser scanning.

13. A laser welding device for welding a plurality of metal members to each other by irradiating laser light onto a portion where the plurality of metal members have been superposed, in which at least one of the metal members from among the plurality of metal members is formed from a metal-plated steel plate in which a base metal has been covered with a coating material that has a melting point below that of the base metal, comprising:
    a processing head that irradiates laser light onto one side surface of one of the metal members, and that is capable of scanning laser light;
    a control unit that controls an operation of the processing head, the control unit controlling the processing head to
        irradiate the laser light onto one side surface of one of the metal members to form a protruding portion on the other side surface on the opposite side so as to project from the other side surface,
        melt a part of the protruding portion that was formed by scanning the laser light with the processing head to generate a metal melt flow toward a top of the protruding portion so as to form a protrusion having a height that projects farther from the other side surface than a height of the protruding portion so that the height of the protrusion is greater than the height of the protruding portion, and irradiate laser light onto a plurality of the metal members that are superposed with the protrusion interposed therebetween to weld the metal members to each other.

14. The laser welding device according to claim 13, wherein
the control unit causes laser light to be scanned so that an apex of the protruding portion that rises on the other side surface remains when forming the protrusion.

15. The laser welding device according to claim 13, wherein
the control unit sets a time to scan the laser light to be at least as long as a time required for a starting end portion to solidify to form the protrusion when forming the protrusion.

16. The laser welding device according to claim 13, wherein
the control unit causes laser light to be scanned to form the protruding portion at a starting end portion of scanning when forming the protrusion.

* * * * *